United States Patent
Clevorn et al.

(10) Patent No.: US 9,743,343 B2
(45) Date of Patent: Aug. 22, 2017

(54) METHOD FOR RECEIVING INFORMATION AND COMMUNICATION TERMINAL

(75) Inventors: Thorsten Clevorn, Duesseldorf (DE); Bertram Gunzelmann, Koenigsbrunn (DE)

(73) Assignee: INTEL DEUTSCHLAND GMBH, Neubiberg (DE)

( * ) Notice: Subject to any disclaimer, the term of this patent is extended or adjusted under 35 U.S.C. 154(b) by 837 days.

(21) Appl. No.: 13/316,708

(22) Filed: Dec. 12, 2011

(65) Prior Publication Data
US 2013/0150105 A1   Jun. 13, 2013

(51) Int. Cl.
*H04B 15/00* (2006.01)
*H04W 48/12* (2009.01)
*H04W 76/04* (2009.01)

(52) U.S. Cl.
CPC .......... *H04W 48/12* (2013.01); *H04W 76/046* (2013.01)

(58) Field of Classification Search
CPC . H04B 15/00; H04B 17/0057; H04W 72/082; H04W 4/00; H04W 8/26; H04W 24/00
USPC .............. 455/501, 507, 558, 67.11, 525, 522
See application file for complete search history.

(56) References Cited

U.S. PATENT DOCUMENTS

| | | | | |
|---|---|---|---|---|
| 6,307,846 B1* | 10/2001 | Willey | .................. | H04W 68/02 370/329 |
| 7,414,989 B2* | 8/2008 | Kuchibhotla | ......... | H04L 1/1671 370/329 |
| 7,453,838 B1* | 11/2008 | Hans | ........................ | H04L 29/06 370/328 |
| 8,483,697 B2* | 7/2013 | Fischer | .................. | H04W 72/02 370/328 |
| 2002/0041584 A1* | 4/2002 | Sashihara | .............. | H04W 72/02 370/337 |
| 2002/0197959 A1* | 12/2002 | Attar | .......................... | H04L 1/20 455/63.1 |
| 2003/0045292 A1* | 3/2003 | Kim | ........................ | H04W 36/18 455/437 |
| 2003/0236103 A1* | 12/2003 | Tamaki | ................... | H04L 12/24 455/552.1 |
| 2006/0211418 A1* | 9/2006 | Hofmann | ............... | H04W 36/32 455/426.1 |
| 2010/0027483 A1* | 2/2010 | Ofuji | ...................... | H04W 16/02 370/329 |
| 2010/0151869 A1* | 6/2010 | Fischer | .................. | H04W 72/02 455/450 |
| 2010/0202400 A1* | 8/2010 | Richardson | ........... | H04W 8/005 370/330 |
| 2010/0284266 A1* | 11/2010 | Jang | ........................ | H04J 11/005 370/210 |
| 2011/0019633 A1* | 1/2011 | Tajima | ................. | H04W 76/027 370/329 |

(Continued)

*Primary Examiner* — Md Talukder

(74) *Attorney, Agent, or Firm* — Viering, Jentschura & Partner mbB

(57) ABSTRACT

According to one aspect of this disclosure, a method for receiving information is provided, the method comprising determining whether there is a conflict between the reception of first information by a communication terminal from a first base station and the reception of second information by the communication terminal and depending on the result of the determination, controlling a receiver of the communication terminal to receive the first information from a second base station.

17 Claims, 7 Drawing Sheets

(56) References Cited

U.S. PATENT DOCUMENTS

| | | | |
|---|---|---|---|
| 2011/0081883 A1* | 4/2011 | Daly | H04L 12/1895 455/404.1 |
| 2011/0235743 A1* | 9/2011 | Lee, II | H04L 5/0048 375/295 |
| 2011/0281585 A1* | 11/2011 | Kwon | H04L 1/0002 455/436 |
| 2011/0286346 A1* | 11/2011 | Barbieri | H04B 17/327 370/252 |
| 2012/0039339 A1* | 2/2012 | Kurita | H04L 45/00 370/400 |
| 2012/0135764 A1* | 5/2012 | Ohashi | H04L 1/0001 455/501 |
| 2012/0157072 A1* | 6/2012 | Yu | H04W 76/025 455/418 |
| 2012/0172011 A1* | 7/2012 | Gupta | H04W 68/02 455/414.1 |
| 2012/0269173 A1* | 10/2012 | Chin | H04W 68/12 370/332 |
| 2012/0275449 A1* | 11/2012 | Sakoda | H04W 72/1242 370/350 |
| 2012/0307926 A1* | 12/2012 | Kuo | H04B 7/0617 375/267 |
| 2013/0051358 A1* | 2/2013 | Turtinen | H04W 74/0816 370/330 |
| 2013/0077581 A1* | 3/2013 | Lee | H04L 25/0204 370/329 |
| 2013/0150105 A1* | 6/2013 | Clevorn | H04W 48/12 455/501 |

* cited by examiner

METHOD FOR RECEIVING INFORMATION AND COMMUNICATION TERMINAL

TECHNICAL FIELD

Aspects of this disclosure generally relate to a method for receiving information and a communication terminal.

BACKGROUND

When operating a communication terminal, the case may occur that the reception of two sets of information, which should both be received by the mobile communication device, has a conflict, e.g. due to the collision of the transmission timing of the two sets of information. Efficient ways to avoid and handle such conflicts are desirable.

SUMMARY

According to one aspect of this disclosure, a method for receiving information is provided, the method comprising determining whether there is a conflict between the reception of first information by a communication terminal from a first base station and the reception of second information by the communication terminal; and depending on the result of the determination, controlling a receiver of the communication terminal to receive the first information from a second base station.

According to another aspect of this disclosure, a communication terminal is provided comprising a determiner, configured to determine whether there is a conflict between the reception of first information by the communication terminal from a first base station and the reception of second information by the communication terminal; and a controller, configured to control a receiver of the communication terminal to receive the first information from a second base station depending on the result of the determination.

According to another aspect of this disclosure, a method for receiving information is provided, the method comprising detecting whether the timing of the transmission of first information collides with the timing of the transmission of second information, wherein the first information and the second information are transmitted by one or more base stations; and switching, if it has been detected that the timing of the transmission of the first information collides with the timing of the transmission of the second information, from a base station transmitting the first information, to another base station transmitting the first information for the reception of the first information.

According to another aspect of this disclosure, a communication terminal is provided comprising a detector configured to detect whether the timing of the transmission of first information collides with the timing of the transmission of second information, wherein the first information and the second information are transmitted by one or more base stations; and a controller configured to control a receiver of the communication terminal to switch, if it has been detected that the timing of the transmission of the first information collides with the timing of the transmission of the second information, from a base station transmitting the first information, to another base station transmitting the first information for the reception of the first information.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects of this disclosure are described with reference to the following drawings, in which.

DESCRIPTION

The following detailed description refers to the accompanying drawings that show, by way of illustration, specific details and aspects of this disclosure in which the invention may be practiced. These aspects of this disclosure are described in sufficient detail to enable those skilled in the art to practice the invention. Other aspects of this disclosure may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
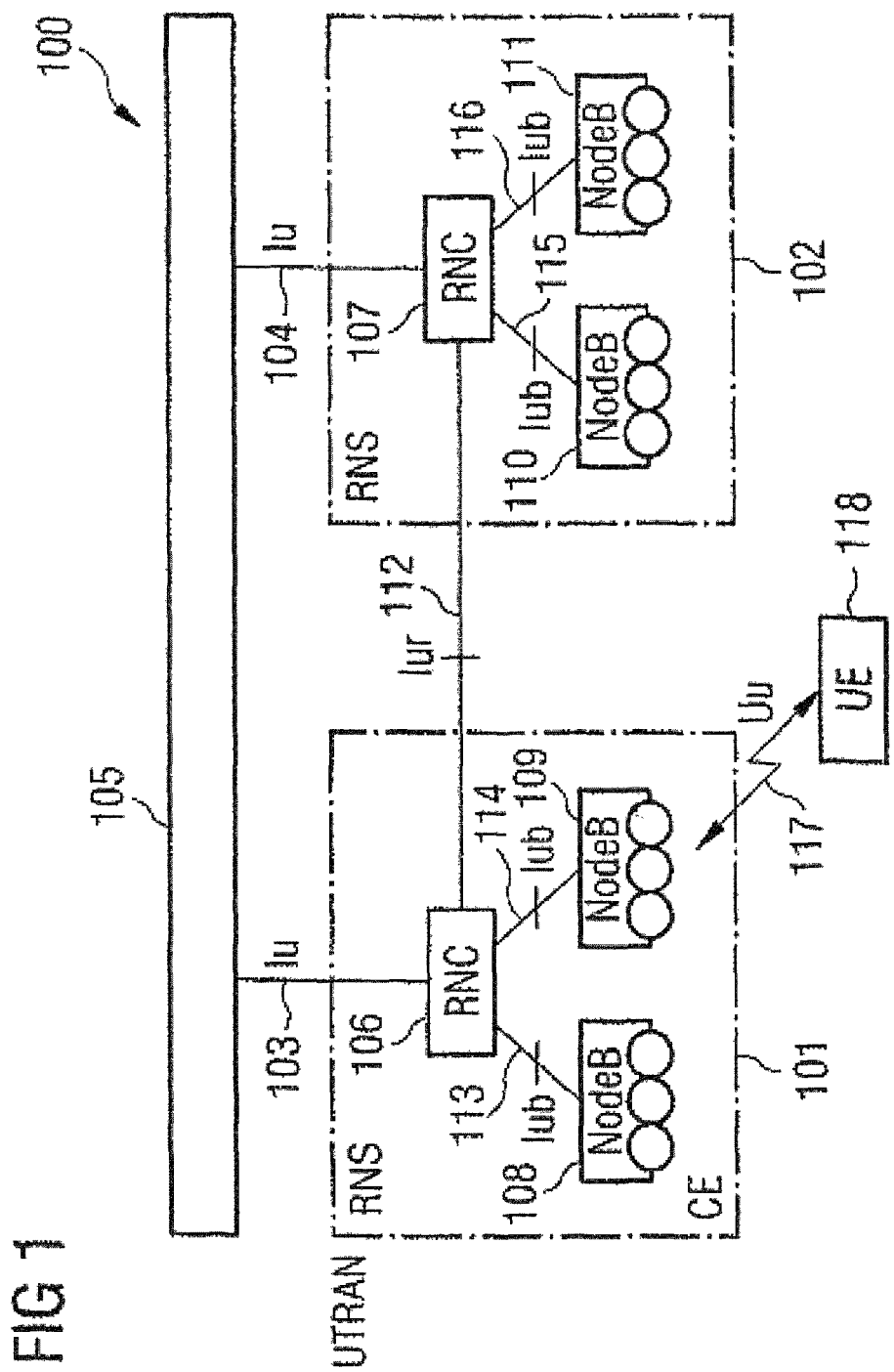
FIG. 1 shows a communication system according to an aspect of this disclosure.

FIG. 1 shows a communication system 100 according to an aspect of this disclosure.

The communication system 100 is a cellular mobile communication system (also referred to as cellular radio communication network in the following) including a radio access network (e.g. an UTRAN, UMTS (Universal Mobile Telecommunications System) Terrestrial Radio Access Network), which has a plurality of mobile radio network subsystems (RNS) 101, 102, which are respectively connected to the UMTS core network (CN) 105 by means of what is known as an Iu interface 103, 104.

A mobile radio network subsystem 101, 102 respectively has a mobile radio network control unit (Radio Network Controller, RNC) 106, 107 and one or more UMTS base stations 108, 109, 110, 111, which are also called NodeB in line with UMTS.

Within the mobile radio access network, the mobile radio network control units 106, 107 of the individual mobile radio network subsystems 101, 102 are connected to one another by means of what is known as an Iur interface 112. Each mobile radio network control unit 106, 107 respectively monitors the allocation of mobile radio resources in all mobile radio cells in a mobile radio network subsystem 101, 102.

A UMTS base station 108, 109, 110, 111 is respectively connected to a mobile radio network control unit 106, 107 associated with the UMTS base station 108, 109, 110, 111 by means of what is known as an Iub interface 113, 114, 115, 116.

Each UMTS base station 108, 109, 110, 111 provides radio coverage for one or more mobile radio cells (CE) within a mobile radio network subsystem 101, 102. Control and user data are transmitted between a respective UMTS base station 108, 109, 110, 111 and a mobile terminal 118

(also referred to as UE, user equipment, e.g. a mobile phone), in a mobile radio cell using an air interface, called Uu air interface 117 in line with UMTS, e.g. on the basis of a multiple access method.

According to one aspect of this disclosure, for the efficient control of radio resources and communication connection between a communication terminal 118 and the radio access network (UTRAN) 101, 102, in accordance with UMTS based on W-CDMA (Wideband Code Division Multiple Access), five connection states are specified on the RRC (Radio Resource Control) protocol layer. The RRC states differ for the type of allocated resources, the activity of the communication terminal 118 and on which level the position of the communication terminal 118 is known to the radio access network.

Figure 2:
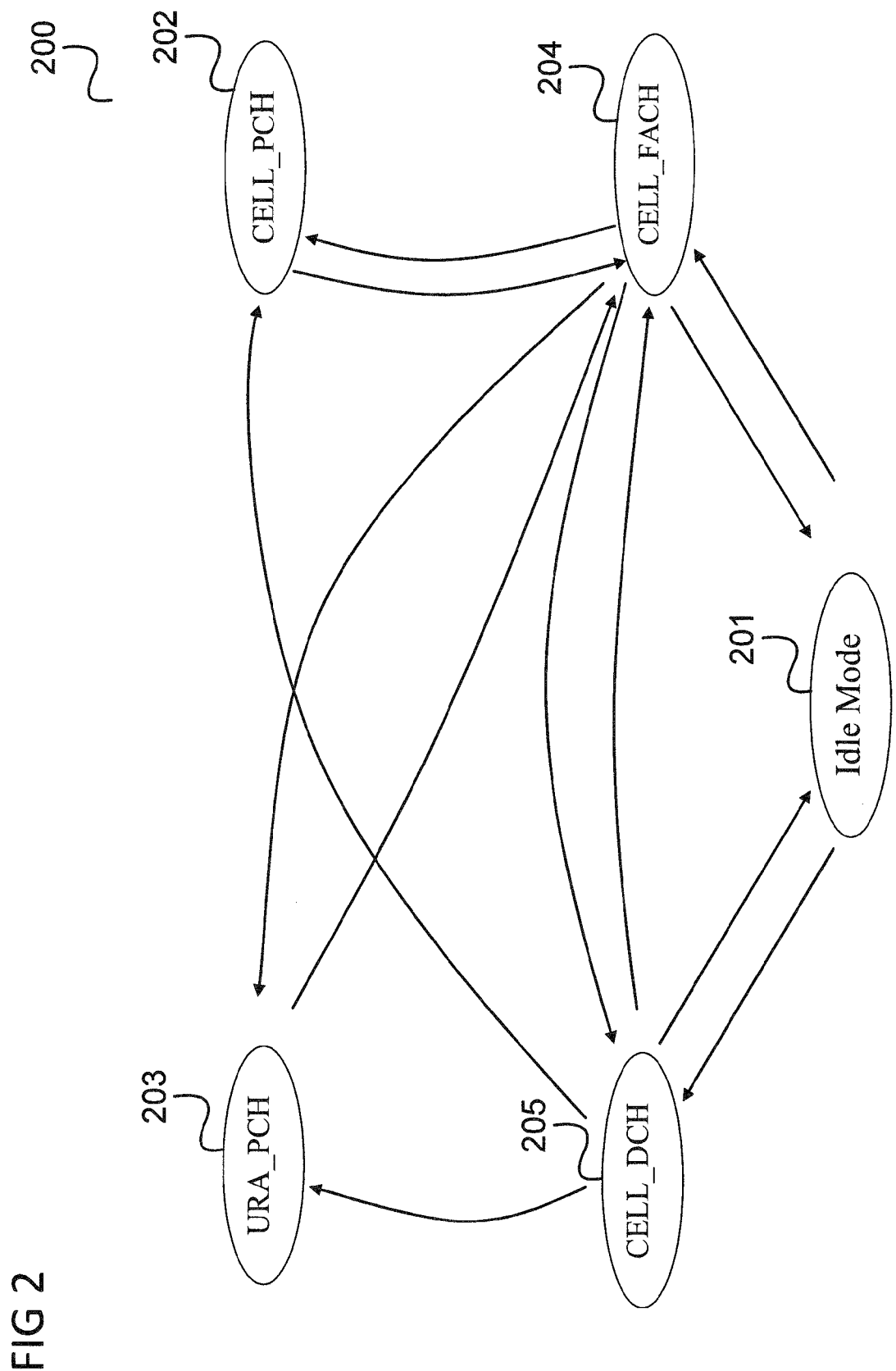
FIG. 2 shows a state diagram according to an aspect of this disclosure.

The RRC states and the state transitions between the various states are illustrated in FIG. 2.

FIG. 2 shows a state diagram 200 according to an aspect of this disclosure.

The state diagram 200 includes the RRC state Idle Mode 201, the RRC state CELL_PCH 202, the RRC state URA_PCH 203, the RRC state CELL_FACH 204, and the RRC state CELL_DCH 205.

Arrows indicate possible state transitions via the RRC states 201 to 205.

In RRC state Idle Mode 201 there is no signaling and data connection between the communication terminal 118 and the radio access network 101, 102. The position of the communication terminal 118 is known only in the UMTS core network at RA (Routing Area) or Location Area (LA) level. In Idle Mode 201 a communication terminal 118 can read the system information on BCH (Broadcast Channel) and can receive notifications on PCH (Paging Channel).

In RRC state CELL_PCH 202 there is a logical signaling connection between the communication terminal 118 and the radio access network 101, 102. In this state a communication terminal 118 can read the system information on BCH (Broadcast Channel) and can receive notifications on the PCH (Paging Channel). The position of the communication terminal 118 is known at radio cell area level.

The RRC state URA_PCH 203 is similar to the CELL_PCH 202, the difference is that the position of the communication terminal 118 is known at URA (radio access network 101, 102 Registration Area) level, i.e. at the level of a group of radio cells.

In RRC state CELL_FACH 204 there is a signaling connection and a data connection between the communication terminal 118 and the radio access network 101, 102. In this state only common resources can be allocated to a communication terminal 118 which are shared with other communication terminals 118 in the radio cell. The position of the communication terminal 118 is known at radio cell area level in this state.

In RRC state CELL_DCH 205 there is a signaling connection and a data connection between the communication terminal 118 and the radio access network 101, 102. In this state dedicated resources can be allocated to a communication terminal 118 and its position is known at radio cell area level.

It should be noted that various aspects of this disclosure may also be based on communication networks according to other communication standards than UMTS, e.g. GSM (Global System for Mobile Communications), LTE (Long Term Evolution), FOMA (Freedom of Mobile Access), CDMA2000 (CDMA: Code Division Multiple Access) etc.

With CMAS (commercial mobile alert system) the user of the mobile terminal 118 can informed or warned of disasters like earth quakes and tsunamis. Currently, CMAS is a US only system and required as add-on e.g. to the UMTS standard. However, there are discussions to put it into the 3GPP (Third Generation Partnership Project) UMTS standard as independent and worldwide requirement. When based on UMTS, CMAS typically uses a S-CCPCH (secondary common control physical channel) to transmit its data to the users.

However, there is a potential conflict with receiving pagings. There can be several S-CCPCHs and also the paging channel (PCH) is typically mapped to an S-CCPCH. A paging sequence consists of the mobile terminal 118 detecting the paging indicator (PI) on the PICH (Paging Indicator Channel) and, in case of a positive paging (i.e. upon detection of its paging indicator on the PICH), the mobile terminal 118 reading the associated PCH on a S-CCPCH. Thus, if the S-CCPCH transmission time instances of the CMAS and the PCH overlap, the mobile terminal 118 cannot read both messages (paging message and CMAS message) but only one. Here, it is assumed that the mobile terminal 118 can decode only one S-CCPCH at a time, which can be seen as a typical case presently, because so far the reception of a second S-CCPCH in parallel has not been required.

Further, it should be noted that the transmission time instances of the CMAS and the PCH typically follow certain repetition patterns (e.g. the paging DRX cycle). Therefore, it may happen that a CMAS transmission and then a PCH transmission not only overlap once, but may overlap frequently or continuously.

It should be noted that in this context, it can be assumed that the mobile terminal 118 is in idle mode 201, CELL_PCH 202, or URA_PCH 203, since only then the PCH needs to be received. Generally, the mobile terminal 118 is in this context assumed to be in a PCH reception state, i.e. a state in which the PCH needs to be received, e.g. including idle mode 201, CELL_PCH 202 and URA_PCH 203. The PCH reception state can for example be a state in which the mobile terminal 118 has no dedicated connection to the mobile communication network and therefore needs to receive the PCH.

A straight-forward solution for avoiding a conflict between a CMAS transmission and a PCH transmission may be seen in adding a second S-CCPCH decoder to the receiver of the mobile terminal 118. However, this would require additional chip area and cannot be implemented into an existing mobile terminal (e.g. by software update).

Another conflict issue may arise due to the following. The mobile terminal 118 may include two SIMs (Subscriber Identity modules) to be registered in two networks at the same time. For example, the mobile terminal 118 may be a UMTS phone supporting dual-SIM-dual-standby (DSDS). In one aspect of this disclosure, for example, the mobile terminal 118 may be registered in two mobile communication networks concurrently using its two SIM cards. In this case, if the mobile terminal is in idle state (which can be seen as stand-by state, or in CELL_PCH 202, or URA_PCH 203) it typically should be able to receive pagings, i.e. notifications of incoming calls, from both mobile communication networks. For this, the mobile terminal 118 may tune to each of the two mobile communication networks at their respective possible paging instances (i.e. at the times at which pagings can occur). It is assumed that the point of time where a paging can occur is known by the mobile terminal 118 (as it is typically the case, e.g. according to UMTS).

However, the possible paging instances of the two mobile communication networks may overlap. In this case, the mobile terminal 118 may only be able to listen to the paging channel of one of the mobile communication network and may thus miss a possible paging of the other mobile communication network. Furthermore, the time interval between pagings is typically constant. Thus, if the possible paging instances of the mobile communication networks overlap, it may happen that the paging instances not only overlap once, but overlap frequently or continuously such that it may occur that the mobile terminal 118 is unable to listen to one of the mobile communication networks for a long period.

According to one aspect of this disclosure, conflicts between the reception (or transmission) of CMAS data and the reception (or transmission) of paging information of two sets of paging information from two different base stations (e.g. belonging to two different networks) as described above are solved. Generally, according to an aspect of this disclosure, a conflict between the reception of first information and the reception of second information is solved. Various aspects of this disclosure as described below can be seen as being based on the mobile terminal side.

Figure 3:
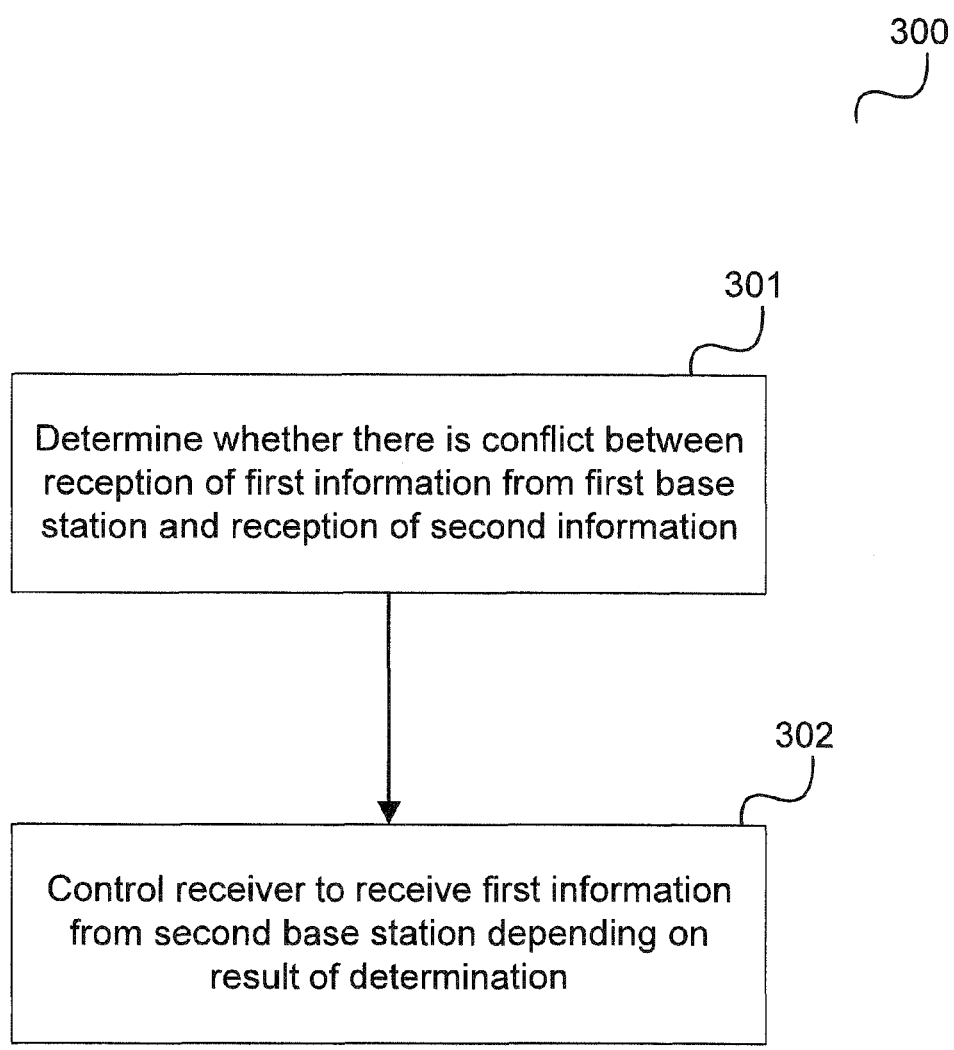
FIG. 3 shows a flow diagram according to an aspect of this disclosure.

FIG. 3 shows a flow diagram 300 according to an aspect of this disclosure.

The flow diagram 300 illustrates a method for receiving information.

In 301, it is determined whether there is a conflict between the reception of first information by a communication terminal from a first base station and the reception of second information by the communication terminal.

In 302, depending on the result of the determination, a receiver of the communication terminal is controlled to receive the first information from a second base station.

According to one aspect of this disclosure, in other words, it is determined whether a communication terminal is able to receive first information and second information wherein the first information is received from a first base station and the second information is received from the same base station or another base station. Depending on the determination (e.g. if it is the case that the communication terminal cannot receive both the first information and the second information, e.g. because of a timing conflict, e.g. because the transmission of the first information and the second information overlap in time) the communication terminal may receive the first information from a second base station. In other words, if for example a conflict between the reception of two sets of information is received, a communication terminal may change the base station from which one set of the information is received. In case that the second information is received from a base station (e.g. from the first base station itself or from a third base station), the communication terminal may or may not also change the base station from which the second information is received.

According to one aspect of this disclosure, the method includes depending on the result of the determination, receiving both the first information and the second information from the second base station.

The method may further include checking whether there is a conflict between the reception of the first information from the second base station and the reception of the second information and, if there it has been determined that there is no conflict between the reception of the first information from the second base station and the reception of the second information, receiving the first information from the second base station.

The checking is for example carried out if it has been determined that there is a conflict between the reception of first information from a first base station and the reception of second information.

According to one aspect of this disclosure, determining whether there is a conflict between the reception of first information from the first base station and the reception of second information includes determining whether there is a conflict between the reception of first information from the first base station and the reception of the second information from the first base station.

According to one aspect of this disclosure, determining whether there is a conflict between the reception of first information from the first base station and the reception of second information includes determining whether there is a conflict between the reception of first information from the first base station and the reception of the second information from a third base station.

The first base station and the third base station are for example base stations of different mobile communication networks. In this case, the communication terminal may for example include two SIMs (Subscriber Identity Modules) or USIMs (Universal Subscriber Identity Modules) such that it may operate with both mobile communication networks.

In one aspect of this disclosure, determining whether there is a conflict between the reception of first information from the first base station and the reception of second information includes determining whether there is a conflict between the timing of the transmission of the first information and the timing of the transmission of the second information.

For example, it is determined that there is a conflict between the timing of the transmission of the first information and the timing of the transmission of the second information if the transmission of the first information overlaps with the transmission of the second information.

At least one of the first information and the second information is for example control information.

For example, at least one of the first information and the second information is paging information.

According to one aspect of this disclosure, at least one of the first information and the second information is commercial mobile alert system information. The first information and the second information may also be other information than paging information or commercial mobile alert system (CMAS) information, for example location information.

According to one aspect of this disclosure, the first information and the second information is information addressed to the communication terminal.

The first base station and the second base station are for example base stations of the same mobile communication network.

The reception quality of the first information from the second base station may be lower than the reception quality of the first information from the first base station. For example, in other words, the first base station operates a radio cell which is the better radio cell than the radio cell operated by the second base station in terms of reception quality of signals sent by the base station, such that, for example, the communication terminal would normally, i.e. when there is no conflict between the reception of the first information and the reception of the second information, not receive information from the second base station, i.e. would for example not camp on the radio cell operated by the second base station but would select the radio cell operated by the first base station.

The first information and the second information are for example transmitted via the same type of physical channel. For example, the first information and the second information are transmitted via the same type of physical control channel. For example, first information and the second information are transmitted via the S-CCPCH.

Figure 4:
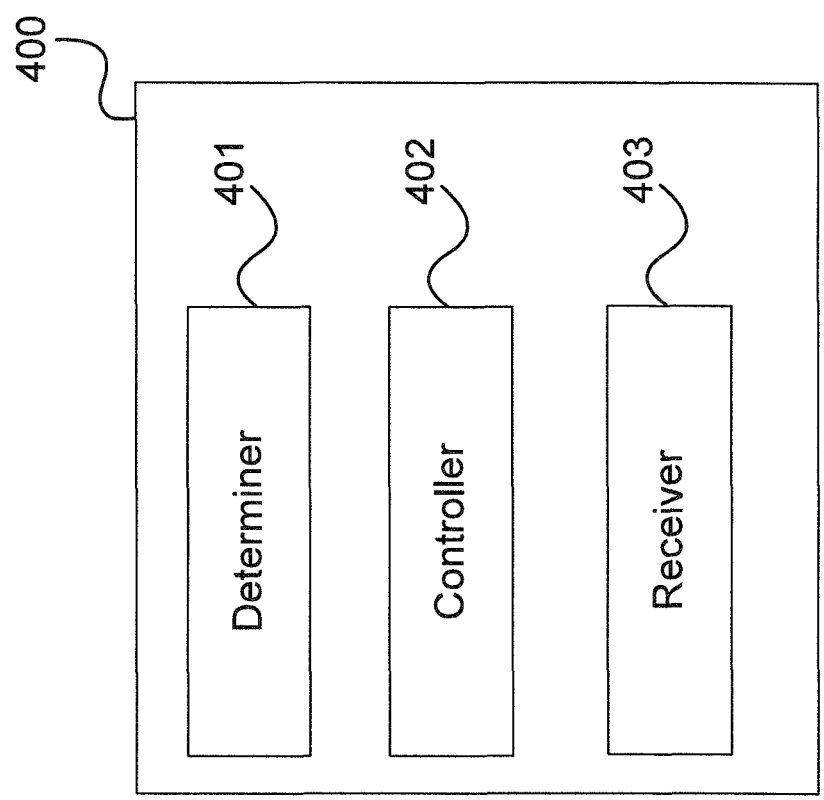
FIG. 4 shows a communication terminal according to an aspect of this disclosure.

The flow illustrated in FIG. 3 is for example carried out by a mobile communication device as illustrated in FIG. 4.

FIG. 4 shows a communication terminal 400 according to an aspect of this disclosure.

The communication terminal 400 includes a determiner 401 configured to determine whether there is a conflict between the reception of first information by the communication terminal from a first base station and the reception of second information by the communication terminal.

The communication terminal 400 further includes a controller 402 configured to control a receiver 403 of the communication terminal 400 to receive the first information from a second base station depending on the result of the determination.

The communication terminal 400 is for example a subscriber terminal of a mobile communication network to which the first base station and the second base station belong, e.g. a mobile phone.

It should be noted that aspects of this disclosure described in context with the method for receiving information described with reference to FIG. 3 are analogously valid for the communication terminal 400 and vice versa.

The determiner 401 may be implemented by any kind of a logic implementing entity, which may be special purpose circuitry or a processor executing software stored in a memory, firmware, or any combination thereof. Thus, it may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). It may also be implemented by a processor executing software, e.g. any kind of computer program, e.g. a computer program using a virtual machine code such as e.g. Java. Any other kind of implementation of its functions may also be used.

In the following, an aspect of this disclosure in which one of the first information and the second information is CMAS information (e.g. the content of a CMAS message) and the other of the first information and the second information is paging information is described.

Figure 5:
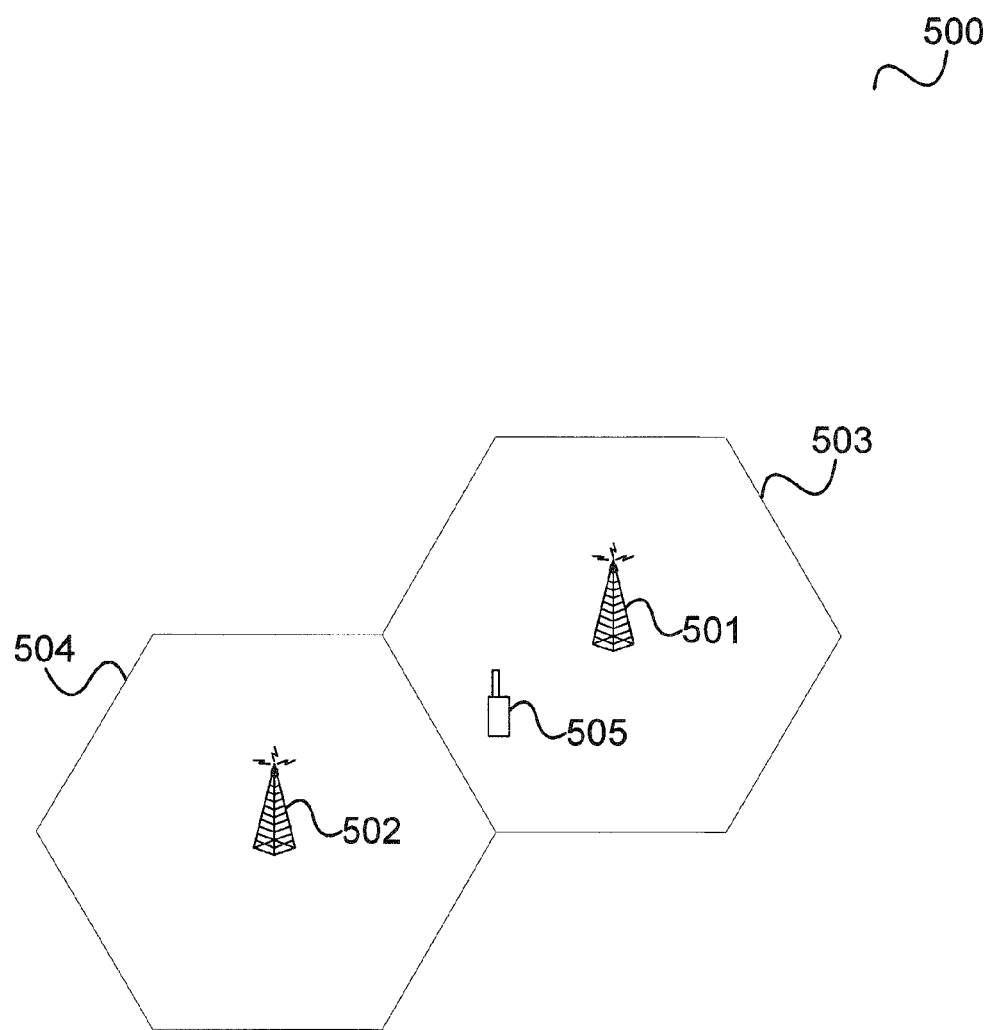
FIG. 5 shows a communication arrangement according to an aspect of this disclosure.

FIG. 5 shows a communication arrangement 500 according to an aspect of this disclosure.

The communication arrangement includes a first base station 501 operating a first radio cell 503 and a second base station 502 operating a second radio cell 504. The base stations 501, 502 for example correspond to two of the base stations 108 to 111 shown in FIG. 1.

A communication terminal 505, for example corresponding to the mobile terminal 118, is located in first radio cell 503. However, it is assumed that the mobile terminal 505 may also receive signals from the second base station 502.

For example, the base stations 503, 504 are base stations of a communication network which is based on soft hand over (SHO), e.g. a UMTS communication network, which means that a communication terminal may receive data from several base stations in an active call. In this case, a communication terminal can often see several base stations when in idle mode (i.e. can receive data from a plurality of base stations, as it is assumed for the communication terminal 505).

As it is typical, it is assumed that the base stations 501, 502 are usually not time synchronized, such that their timing differs. Timing for example refers to the frame starting times of the PCCPCH (primary common control physical channel), to which the frames of all other channels (e.g. the S-CCPCH) have a defined offset and to which also the data in these channels (e.g. the PCH and the SCCPCH) have a defined offset.

It is further assumed that the base station 501 transmits CMAS information and PCH information. In case of a conflict of the reception of the CMAS information and the paging information (i.e. the PCH) in the first radio cell 503, e.g. in case of an overlap of the transmission of the CMAS information and the transmission of the paging information in the first radio cell 503, according to one aspect of this disclosure, the communication terminal 505 reselects to the second radio cell 504 (e.g. may initiate a handover to the second radio cell 504). The CMAS and PCH timing may be different in the second radio cell 504 and non-overlapping due to the different timing in the second radio cell 504.

Alternatively, for example in case there is also a conflict between the CMAS information transmission and the paging information transmission in the second radio cell 504, the communication terminal 505 may exploit the timing difference between the first radio cell 503 and the second radio cell 504 by receiving the paging information from one of the base stations 501,502 and receiving the CMAS information from the other of the base stations 501, 502. Because of the typically different timing of the first cell 503 and the second cell 504, there is a chance that the reception conflict is solved in this way since if the transmission of the paging information and the transmission of the CMAS transmission in the first radio cell 503 overlap there is a chance that they do not overlap in the second radio cell 504.

It should be noted that according to UTMS, the paging information for the communication terminal 505 is only transmitted in the radio cells in the UTRAN registration area (URA) of the communication terminal 505. According to one aspect of this disclosure, e.g. in a kind of soft handover, the paging information is transmitted in both the first radio cell 503 (i.e. by the first base station 501) and the second radio cell 504 (i.e. by the second base station 502), e.g. due to the fact that both base stations 501, 502 are part of the URA of the communication terminal 505. In this case, if the radio conditions are sufficient for decoding the paging information from the second base station 502, there is no difference for the communication terminal 505 when receiving the paging information from the second base station 502 instead of the first base station 501.

It should be noted that the new radio cell (in this case the second radio cell 504) does not necessarily have to be the better radio cell of the two radio cells 503, 504 in terms of reception quality. For example, it may be a priority decision whether rather a conflict between the reception of paging information and CMAS information should be avoided or whether rather the paging information and CMAS information should be received from the base station which offers the better reception quality.

Further, since the CMAS is a common channel, i.e. the CMAS information is common for a multiplicity of base stations (e.g. including the first base station 501 and the second base station 502) the communication terminal 505 can receive it also via the second radio cell 504 instead of the first radio cell 503 without it being required that the network side of the communication system is informed.

It should further be noted that the time required for switching from the first radio cell 503 to the second radio cell 504 is typically much shorter than a paging cycle. So, the switching can be easily accommodated.

In the following, alternatives to the switching to another radio cell for the reception of the CMAS information or the paging information as described above are described.

Firstly, it should be noted that the chance that the CMAS and PCH instances overlap is typically small due to the long gaps between their transmissions, e.g. the paging interval is often larger than 1 second (100 frames). In the rare instances when they overlap one could do a priority decision on which to read or reading them alternating with a certain pattern. It can be taken into consideration that the reception of the SCCPCH (CMAS or PCH) cannot not be assumed to be error free. A paging is typically repeated several times if the first occurrence of the paging was not detected and acknowledged. Also for CMAS CRC (Cyclic Redundancy Check) errors can happen. Also the requirements set by the communication standard, an operator or a government agency, e.g. for the failure rate for CMAS and PCH reading may be considered. For example, a high detection rate for CMAS might be mandatory.

Possible patterns could be e.g.

If the PCH interval is less than the CMAS interval (i.e. PCH instances (i.e. times of possible paging information transmissions) come more often than the CMAS transmissions, e.g. one CMAS instance per two PCH instances), then the communication terminal listens to the PCH only in the time instances where there is no CMAS transmission. Since paging information is typically repeated this gives still a high rate of paging reception. Similar considerations are valid if CMAS comes more often than PCH.

If CMAS and PCH continuously overlap, one could reduce the PCH reading to the absolute minimum by reading it only once and not waiting for repetitions. For example, if the communication terminal 505 detects that a paging is repeated four times in case of errors, it reads the PCH only every $4^{th}$ time and the other three times it listens on the CMAS.

The network side may support these approaches, for example as follows. For example, the network may try to avoid overlapping CMAS and PCH by trying to adapt the positions of CMAS and PCH to solve the conflict. However, the position e.g. of the PCH may be fixed and the PCHs of all users (i.e. of all communication terminals in the cell) may be distributed. Thus, one approach could be to define a time interval where no PCH transmission is allocated for any communication terminal. Or the network could transmit the CMAS twice at different timings so that if the PCH transmission overlaps with one CMAS transmission, the communication terminal can read the second CMAS transmission.

Further, it should be again noted that the CMAS and PCH information are transmitted in certain intervals, e.g. the paging cycle. This, as mentioned above, can result in that the CMAS transmission and the PCH transmission continuously overlap. Since the network typically has complete control over the system, it could adapt the paging cycle so that the paging (and with it the PCH if a positive paging indicator was decoded) has a different e.g. shorter paging cycle. This may result in non-overlapping PCH time instances. The network may also shorten the paging cycle to increase the number of retransmission of the paging. For example, if the paging cycle is reduced by factor 2, the number of retransmissions can be doubled without any additional maximum delay. This may be beneficial for an approach with alternating priority based reading of PCH and CMAS such as in the approach mentioned above in which a communication terminal with only a single S-CCPCH decoder tries to decode overlapping CMAS and PCH transmissions by a certain alternating pattern, e.g. with priority on CMAS. To support this, the network could signal in a message an indication of the pattern or the priority that should be used (e.g. of the best pattern or priority). The network typically possesses the complete information on the setup, e.g. the paging cycle and the maximum retransmissions, the error protection and repetition of the CMAS data, etc. Thus, the network can easily derive the best strategy a communication could use to receive overlapping CMAS and PCH transmissions in parallel with a single S-CCPCH. This information can be shared when the network detects a conflict for a communication terminal or already at the beginning, i.e. at registration of the communication terminal in the network. This strategy may be common for all communication terminals in the radio cell such that this information can be included in a broadcast message which is distributed in (long) regular intervals. It should be noted that there exist a manifold of strategies which should be adapted to the actual network settings.

For another alternative to the switching to another radio cell for the reception of the CMAS information or the paging information as described above it should be noted that the reading of the S-CCPCH is not a continuous process. For example, a PCH reading typically requires only 10 ms every paging interval which is much larger than 10 ms, e.g. longer than one second. Thus, when CMAS and PCH transmissions overlap, the received signal (e.g. the IQ samples) of one of the transmissions may be stored in a memory and may be processed afterwards as a second S-CCPCH processing (while processing the received signal of the other transmission in a first S-CCPCH processing normally upon reception). This can be referred to as offline processing (OLP). The memory is usually already available in the communication terminal due to the RAM requirements of the high throughput data reception, e.g. of HSDPA. In idle state, CELL_PCH and URA_PCH this memory is not used and can thus be reused for OLP, e.g. for a second S-CCPCH processing. With the OLP for the second S-CCPCH, both CMAS information and PCH information can be received with full quality with only one of them having a (very small and therefore negligible) delay.

Further, it should be noted that the capability of a communication terminal to operate with two SIM cards (i.e. dual SIM), e.g. the capability of DSDS which means that the communication terminal is connected to two networks (one for each SIM) in parallel, both in idle state CELL_PCH, or URA_PCH, and thus to receive pagings (i.e. calls) on both networks can be used in a conflict of CMAS and PCH transmissions, depending on the implementation of the two paging receptions. If, for example, for each paging an S-CCPCH exists, both paging PCHs could be mapped to a single S-CCPCH if they do not overlap and the free S-CCPCH could be used for CMAS reception. Even if the two pagings would overlap on the single S-CCPCH, for example an alternating pattern could be applied for the reception of the pagings. With the repetition of pagings, this can still allow paging reception of both networks.

It should be noted that with being connected to two networks there might be also two CMAS channels, one for each network. However, it can be assumed that in case of an emergency the CMAS information on both networks would have the same content such that it is only necessary to listen only to one CMAS.

It should further be noted that with two PCHs and (potentially) two CMAS channels but also potentially two S-CCPCHs available there exist a lot of other options for the approaches described above to avoid or solve a conflict between the reception of CMAS information and paging information.

A conflict between the reception and CMAS information and paging information may be avoided when more than one receiver is available in the communication terminal. For example, a feature of UMTS is "Dual-Cell/Dual-band HSUPA", where high-speed uplink data is transmitted to a second radio cell (possibly on a second frequency/band). This requires in the downlink the reception of additional control channels for the second radio cell. For this one can just double up an existing receiver, e.g. the receiver according to UTMS Rel99, due to simplicity and thus have the additional S-CCPCH decoder of the second (added) receiver. Thus, there may be a spare S-CCPCH decoding resource on the second Rel99 receiver. Since according to Dual-Cell/Dual-band HSUPA the second receiver is not used to read an S-CCPCH, CMAS information or PCH information can be routed to the S-CCPCH of the second receiver and thus could receive both in parallel. This may for example only be done in case of a conflict between the reception of CMAS information and PCH information. If there is no conflict, both CMAS and PCH information are decoded by the first Rel99 receiver to save power by not powering on the second receiver, which is typically off in the idle state, CELL_PCH and URA_PCH. The usage of two different S-CCPCH decoders for CMAS reception and PCH reception is illustrated in FIG. 6.

Figure 6:
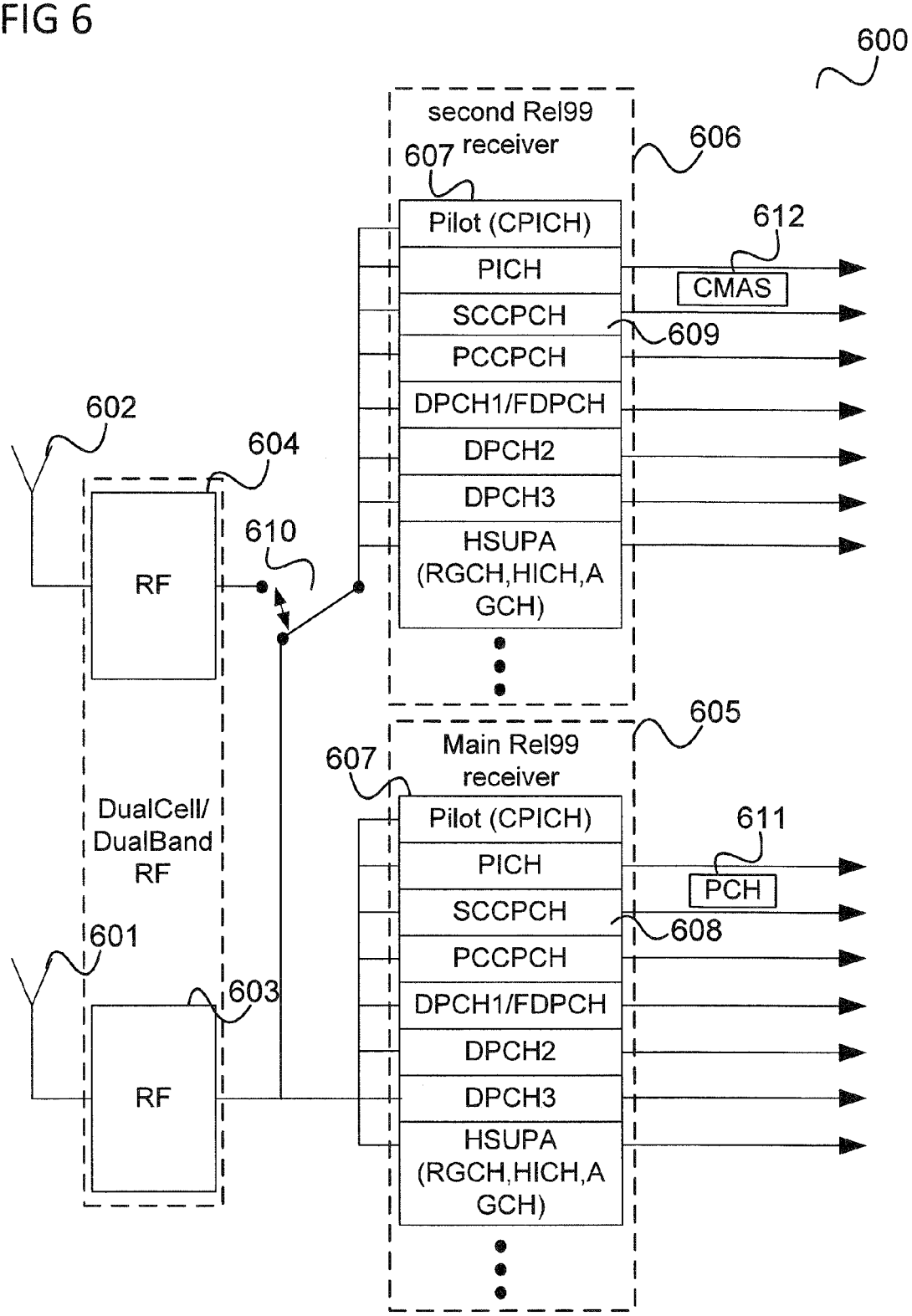
FIG. 6 shows a communication terminal.

FIG. 6 shows a communication terminal 600.

The communication terminal 600 includes a first antenna 601, a first RF (radio frequency) receiver 603, a second antenna 602 and a second RF receiver 604. Signals received by the first antenna 601 are filtered and converted into baseband by the first RF receiver 603. Signals received by the second antenna 602 are filtered and converted into baseband by the second RF receiver 604. In idle mode, CELL_PCH and URA_PCH, the second RF receiver 604 is not used.

The communication terminal 600 includes a first Rel99 receiver 605 and a second Rel99 receiver 606. Both the first Rel99 receiver 605 and the second Rel99 receiver 606 include decoders 607 for various channels (e.g. PICH, DPCH (dedicated physical channel), . . . ) which may for example perform the despreading of received signals for the various channels. Particularly, the first Rel99 receiver 605 includes a first SCCPCH decoder 608 and the second Rel99 receiver 606 includes a second SCCPCH decoder 609.

In this example, both CMAS signals and PCH signals are received via the first antenna 601 and the first RF receiver 603. Both the first Rel99 receiver 605 and the second Rel99 receiver 606 are configured to be supplied by received signals from the first Rel99 receiver 603. Specifically, in this example, PCH signals are supplied to the first Rel99 receiver 605 and CMAS signals are supplied to the second Rel99 receiver 606. For example, in idle mode, CELL_PCH, and URA_PCH the second Rel99 receiver 606 is switched (e.g. by means of a switch 610) to be supplied by received signals from the first RF receiver 603 instead of the second RF receiver 604.

Accordingly, the first SCCPCH decoder 608 decodes received PCH signals (i.e. signals including PCH information) and the second SCCPCH decoder 609 decodes received CMAS signals (i.e. signals including CMAS information). The decoded PCH information 611 and the decoded CMAS information 612 are then forwarded to other components (not shown) of the communication terminal 600 for further processing.

As described above, a communication terminal may for example use the following strategies for the reception of CMAS and PCH information in case of overlapping S-CCPCH transmissions of the CMAS and PCH information:

Priority and alternating pattern based reading of CMAS and PCH;

Switch to another cell with different timing or switch between to cells with different timing;

Store the incoming signal and do offline processing for one of the S-CCPCHs;

Use enhanced capabilities of DSDS phones, e.g. two S-CCPCH decoders, and reorganize PCH and CMAS accordingly;

Use the S-CCPCH in a potential full second Rel99 receiver in a Dual-Cell HSUPA phone.

In the following, an aspect of this disclosure in which the first information is paging information of a first cell and the second information is paging information of a second cell is described.

Figure 7:
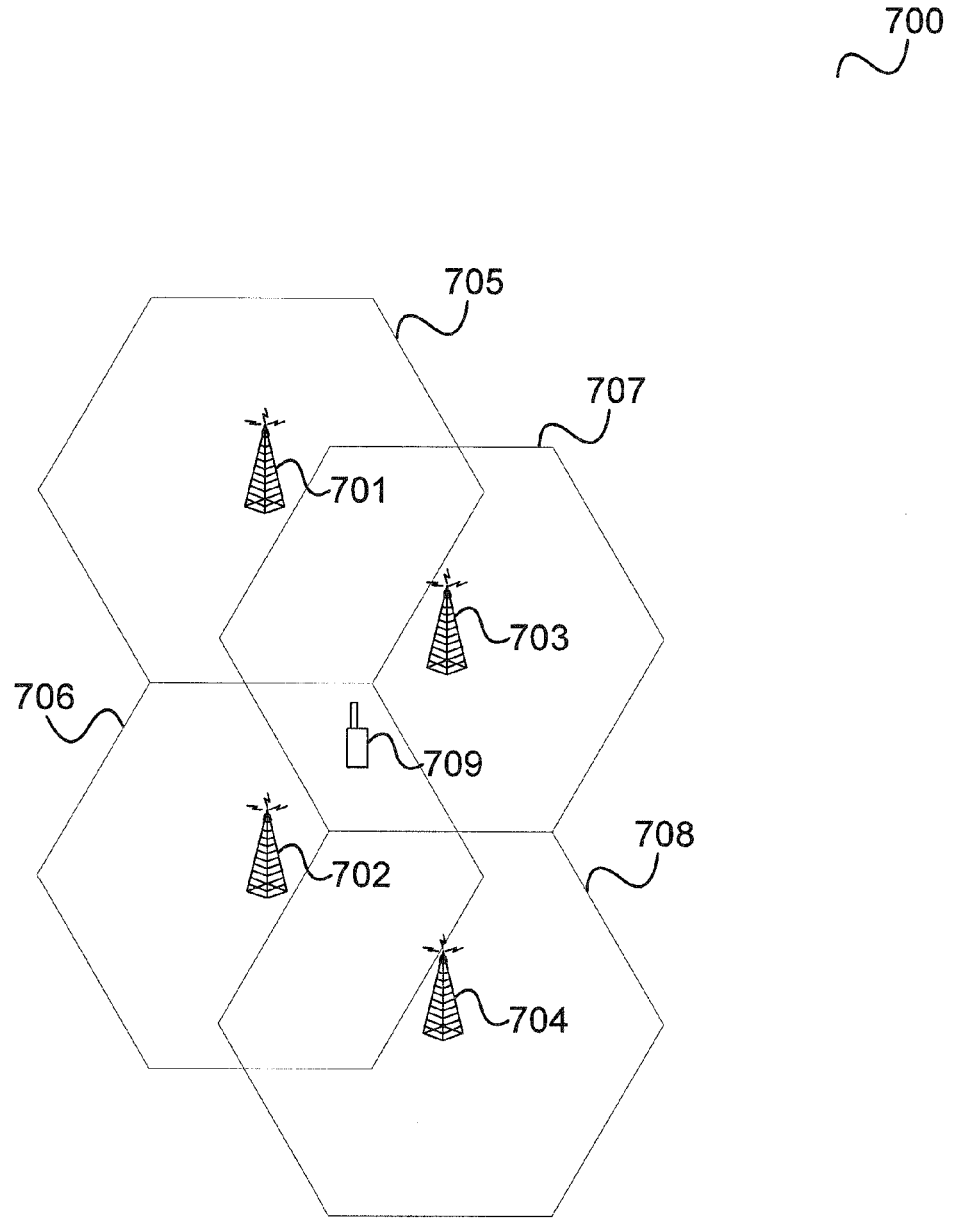
FIG. 7 shows a communication arrangement according to an aspect of this disclosure.

FIG. 7 shows a communication arrangement 700 according to an aspect of this disclosure.

The communication arrangement includes a first base station 701 operating a first radio cell 705, a second base station 702 operating a second radio cell 706, a third base station 703 operating a third radio 707 and a fourth base station 704 operating a fourth radio cell 708. The first base station 701 and the second base station 702 are assumed to be part of a first mobile communication network and the third base station 703 and the fourth base station 704 are assumed to be part of a second mobile communication network. For example the first base station 701 and the second base station 702 correspond to two of the base stations 108 to 111 of the mobile communication network of FIG. 1 and the third base station 703 and the fourth base station 704 correspond to two base stations of another mobile communication network, e.g. having a similar structure as the mobile communication network of FIG. 1.

A communication terminal 709, for example corresponding to the mobile terminal 118, is located in first radio cell 705 and the third radio cell 706. However, it is assumed that the communication terminal 709 may also receive signals from the second base station 702 and the fourth base station 704. The communication terminal 709 is assumed to have a SIM (Subscriber Identity Module) for each of the mobile communication networks.

The communication terminal 709 can receive paging in idle mode 201, URA_PCH 203 and CELL_PCH 202. As explained above, in idle mode 201 and in URA_PCH 203 the communication terminal 709 is not known to a mobile communication network at cell level, but only on the URA (UTRAN registration area) level. The URA typically covers a lot of cells, e.g. a complete RNC (radio network controller) region and allows avoiding that the communication terminal 709 and the mobile communication network need to update the communication terminal location (i.e. the radio cell in which it is located) when the communication terminal is moving. Only in CELL_PCH 202 does the mobile communication network know to which radio cell the communication terminal 709 is listening for paging information. In this case, the paging information (PICH and PCH/SCCPCH) needs to be transmitted only in this specific radio cell. In contrast, in idle mode 201 and URA_PCH 203 the radio cell in which the communication terminal 709 is listening to is not known to the mobile communication network. Thus, the mobile communication network needs to transmit the paging information on all radio cells in the URA of the communication terminal 709.

In idle mode 201 and URA_PCH 203 the communication terminal 709 selects, for each mobile communication network, the best radio cell 705, 706, 707, 708 (e.g. in terms of reception quality) it sees (i.e. operated by a base station from which it can receive signals) to listen to the paging information (PICH and PCH/SCCPCH) of the mobile communication network. As mentioned above, e.g. in a soft-handover based communication networks like UMTS networks, the communication terminal 709 typically sees several other radio cells with sometimes quite good quality as it is assumed here for the second radio cell 706 and the fourth radio cell 708. Since the timing of the radio cells 705 to 708 (even of radio cells of the same mobile communication network) are not aligned in terms of timing, the timing of the PICH and the PCH is potentially different in the radio cells 705 to 708.

It is assumed that the communication terminal 709 is camped on the first radio cell 705 for the first mobile communication network and is camped on the third radio cell 707 for the second mobile communication network. Accordingly, the communication terminal 709 listens to paging information of the first mobile communication network by listening to the paging channel of the first base station 701 and listens to paging information of the second mobile communication network by listening to the paging channel of the third base station 703.

According to one aspect of this disclosure, in case that there is a conflict in receiving in parallel (in time) pagings from the first radio cell 705 and the third radio cell 707, the communication terminal 709 tries to select for one or both of the mobile communication networks (i.e. SIMs) another visible radio cells with sufficient quality to read the paging information.

In this example, it is assumed that the communication terminal 709 selects the second radio cell 706 for the first mobile communication network and starts receiving paging information of the first mobile communication network from the second base station 702 and/or selects the fourth radio cell 708 for the second mobile communication network and starts receiving paging information of the second mobile communication network from the fourth base station 708. The communication terminal 709 may for example do a cell reselection (e.g. a handover) to the second radio cell 706 and/or the fourth radio cell 708. The communication terminal 709 may also stay camped on the first radio cell 705 and the third radio cell 707 while receiving the paging information from the second base station 702 and/or the third base station 703.

There is a chance that with the reception of the paging information from the second base station 703 and/or the fourth base station 704 the timing conflict for the reception of the paging information is solved. The reception quality of the second radio cell 706 and the fourth radio cell 708 can be expected to be lower than that of the first radio cell 705 and the third radio cell 707 because the communication terminal 709 can be assumed to have originally selected, for each mobile communication network, the best radio cell (in terms of reception quality) for camping. Therefore, before the switching of the reception of the paging information to the second radio cell 706 and/or the fourth radio cell 708, it may be checked if the transmission conditions in these cells 706, 708 are sufficient to read the paging information, e.g. with possible retransmissions.

In one aspect of this disclosure, a dynamic receive diversity (RxDiv) communication terminal is used and RxDiv is switched on to improve the reception quality to improve the reception quality in a radio cell which was selected due to a paging collision. If the paging information is received via the best radio cells, e.g. because no paging collision occurs with those, RxDiv may be kept switched off to save power.

For example, the communication terminal is a Dual-SIM UE (User Equipment) camped with a first SIM (SIM1) on the first mobile communication network (NW1) on the first radio cell 505 (cell A) and sees also the second radio cell 506 (cell B) and further radio cells of NW1 (cells C and D, not shown). With a second SIM (SIM2) it is camped on the second mobile communication network (NW2) on the third radio cell 507 (cell X) and sees also the fourth radio cell 508 (cell Y) and a further radio cell of NW2 (cell Z, not shown). If there is a paging timing conflict of radio cell A and radio cell X the UE determines the paging timings (PICH and PCH) of cells B, C, D, X, and Z (e.g. by reading the PCCPCH of those) and selects a combination of two cells (from A-D and X-Z) which has no timing conflict and the best reception quality for both SIMs/networks (e.g. include the second radio cell 506 and/or the fourth radio cell 508 as in the example described above). The selection can take into account e.g. quality (e.g. the CPICH SNR, i.e. the signal to noise ratio of the common pilot channel) of the radio cells, a user priority of one of the SIMs etc.

In other words, the camped radio cells in the URA may be changed and radio cells may be selected where the reception quality is sufficient such that the paging instances of the selected radio cells do not overlap.

It should be noted that all approaches and alternatives described above may be used independently or may also be combined, e.g. for providing more efficient ways to avoid (or solve) a conflict of the reception of two sets of information.

While the invention has been particularly shown and described with reference to specific aspects of this disclosure, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for receiving information, the method comprising receiving, by a communication terminal, first information from a first base station and second information from a third base station;
   determining that there is a conflict when the reception of the first information by the communication terminal from the first base station is parallel in time to the reception of the second information from the third base station by the communication terminal; and
   controlling, responsive to determining the conflict, a receiver of the communication terminal to receive the first information from a second base station, wherein the controlling comprises selecting the second base station such that a timing of the reception of the first information from the second base station is different from a timing of the reception of the first information from the third base station by the communication terminal.

2. The method according to claim 1, comprising depending on the result of the determination, receiving both the first information and the second information from the second base station.

3. The method according to claim 1, further comprising checking whether there is a conflict between the reception of the first information from the second base station and the reception of the second information and, responsive to it being determined that there is no conflict between the reception of the first information from the second base station and the reception of the second information, receiving the first information from the second base station.

4. The method according to claim 3, wherein the checking is carried out responsive to it having been determined that there is a conflict between the reception of first information from a first base station and the reception of second information.

5. The method according to claim 1, wherein the first base station and the third base station are base stations of different mobile communication networks.

6. The method according to claim 1, wherein it is determined that there is a conflict between the timing of the transmission of the first information and the timing of the transmission of the second information because the transmission of the first information overlaps with the transmission of the second information.

7. The method according to claim 1, wherein at least one of the first information and the second information is control information.

8. The method according to claim 1, wherein at least one of the first information and the second information is paging information.

9. The method according to claim 1, wherein at least one of the first information and the second information is commercial mobile alert system information.

10. The method according to claim 1, wherein the first information and the second information is information addressed to the communication terminal.

11. The method according to claim 1, wherein the first base station and the second base station are base stations of the same mobile communication network.

12. The method according to claim 1, wherein the reception quality of the first information from the second base station is lower than the reception quality of the first information from the first base station.

13. The method according to claim 1, wherein the first information and the second information are transmitted via the same type of physical channel.

14. The method according to claim 1, wherein the first information and the second information are transmitted via the same type of physical control channel.

15. A communication terminal comprising:
a receiver for receiving first information from a first base station and second information from a third base station;
a determiner, configured to determine that there is a conflict when the reception of the first information by the communication terminal from the first base station is parallel in time to the reception of the second information from the third base station by the communication terminal; and
a controller, configured to control, responsive to determining the conflict, a receiver of the communication terminal to receive the first information from another base station, wherein the controller is further configured to select the other base station such that a timing of the reception of the first information from the other base station is different from a timing of the reception of the first information from the first base station by the communication terminal.

16. A method for receiving information, the method comprising receiving first information and second information, wherein the first information and the second information are transmitted by first and second base stations respectively;
detecting that there is a conflict when the reception of the first information from the first base station is parallel in time with the reception of the second information from the second base station;
selecting another base station such that a timing of the reception of the first information from the other base station is different from a timing of the reception of the first information from the first base station; and
switching, responsive to detecting the conflict, to the other base station transmitting the first information for the reception of the first information.

17. A communication terminal comprising
a receiver for receiving first information and second information, wherein the first information and the second information are transmitted by first and second base stations respectively;
a detector configured to detect that there is a conflict when the reception of the first information from the first base station is parallel in time with the reception of the second information from the second base station; and
a controller configured to control a receiver of the communication terminal to switch, responsive to detecting the conflict, to another base station transmitting the first information for the reception of the first information, wherein the controller is further configured to select the other base station such that a timing of the reception of the first information from the other base station is different from a timing of the reception of the first information from the first base station by the communication terminal.

* * * * *